United States Patent
Haggerty et al.

(10) Patent No.: US 11,580,518 B2
(45) Date of Patent: Feb. 14, 2023

(54) DISABLING MOBILE PAYMENTS FOR LOST ELECTRONIC DEVICES

(71) Applicant: Apple Inc., Cupertino, CA (US)

(72) Inventors: David T. Haggerty, San Francisco, CA (US); George R. Dicker, Los Altos, CA (US); Ahmer A. Khan, Milpitas, CA (US); Christopher B. Sharp, San Jose, CA (US); Timothy S. Hurley, Los Gatos, CA (US); Vineet Chadha, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 742 days.

(21) Appl. No.: 14/474,773

(22) Filed: Sep. 2, 2014

(65) Prior Publication Data

US 2015/0193764 A1     Jul. 9, 2015

Related U.S. Application Data

(60) Provisional application No. 61/923,312, filed on Jan. 3, 2014.

(51) Int. Cl.
    *G06Q 20/32*      (2012.01)
    *G06Q 20/40*      (2012.01)
    *H04W 8/22*      (2009.01)

(52) U.S. Cl.
    CPC ....... *G06Q 20/3226* (2013.01); *G06Q 20/322* (2013.01); *G06Q 20/40* (2013.01); *G06Q 20/4014* (2013.01); *H04W 8/22* (2013.01)

(58) Field of Classification Search
None
See application file for complete search history.

(56) References Cited

U.S. PATENT DOCUMENTS

| 6,662,023 B1 * | 12/2003 | Helle | H04W 88/02 455/558 |
| 2003/0055943 A1 * | 3/2003 | Kanai | G06F 3/0605 709/223 |

(Continued)

FOREIGN PATENT DOCUMENTS

| CN | 102307344 A | 1/2012 |
| CN | 103258266 A | 8/2013 |

(Continued)

OTHER PUBLICATIONS

Machine Translation of Korean Patent Publication No. KR 1020120046376.

(Continued)

*Primary Examiner* — Jacob C. Coppola
*Assistant Examiner* — Timothy Paul Sax
(74) *Attorney, Agent, or Firm* — Sterne, Kessler, Goldstein & Fox P.L.L.C.

(57) ABSTRACT

If a user loses an electronic device that has the capability to conduct financial transactions, the user may report that the electronic device is lost using a lost-device software application to a management electronic device associated with a provider of the electronic device. In response to receiving this information, a disabling command is sent to a payment network associated with the financial account of the user to temporarily disable use of the electronic device to conduct the financial transactions. In particular, the electronic device may include a secure element that stores a payment applet for a financial account, and the disabling command may disable a mapping from a virtual identifier for the financial account to a financial primary account number. Subsequently, if the user finds the electronic device, the user may re-enable the capability (and, thus, the mapping) by providing authentication information to the electronic device.

21 Claims, 6 Drawing Sheets

(56) References Cited

U.S. PATENT DOCUMENTS

| | | | |
|---|---|---|---|
| 2007/0095892 A1 | 5/2007 | Lyons et al. | |
| 2008/0306850 A1* | 12/2008 | Horvath | G06Q 20/20 705/35 |
| 2009/0143104 A1* | 6/2009 | Loh | G06Q 20/32 455/558 |
| 2010/0198728 A1* | 8/2010 | Aabye | G06Q 20/401 705/44 |
| 2010/0257612 A1 | 10/2010 | McGuire et al. | |
| 2011/0112918 A1* | 5/2011 | Mestre | G06Q 20/20 705/16 |
| 2012/0030047 A1 | 2/2012 | Fuentes et al. | |
| 2013/0110719 A1* | 5/2013 | Carter | G06Q 20/3227 705/44 |
| 2013/0204793 A1 | 8/2013 | Kerridge et al. | |
| 2013/0260734 A1* | 10/2013 | Jain | H04W 12/06 455/418 |
| 2014/0183258 A1* | 7/2014 | DiMuro | G06Q 20/3821 235/380 |

FOREIGN PATENT DOCUMENTS

| | | | | |
|---|---|---|---|---|
| KR | 1020120046376 | | 5/2012 | |
| WO | 2008052592 A1 | | 5/2008 | |
| WO | WO 2011/126520 A1 | | 10/2011 | |
| WO | 2013028910 A2 | | 2/2013 | |
| WO | 2013155562 A1 | | 10/2013 | |
| WO | WO2013155562 A1 | * | 10/2013 | ............... H04B 5/00 |
| WO | WO2013155562 A1 | * | 10/2013 | ............... H04B 5/00 |
| WO | WO-2013155562 A1 | * | 10/2013 | ............... H04B 5/00 |
| WO | WO 2015/102943 A1 | | 7/2015 | |

OTHER PUBLICATIONS

International Preliminary Report on Patentability and Written Opinion of the International Searching Authority directed to related International Patent Application No. PCT/US2014/071477, dated Jul. 5, 2016; 11 pages.

"What Is Apple's New Secure Enclave And Why Is It Important?" Forbes.com, Sep. 18, 2013 (Retrieved Oct. 24, 2018 from https://www.forbes.com/sites/quora/2013/09/18/what-is-apples-new-secure-enclave-and-why-is-it-important/#ea1c64374cf2); 16 pages.

* cited by examiner

DISABLING MOBILE PAYMENTS FOR LOST ELECTRONIC DEVICES

CROSS REFERENCE TO RELATED APPLICATION

This application claims priority under 35 U.S.C. § 119(e) to U.S. Provisional Application Ser. No. 61/923,312, entitled "Disabling Mobile Payments for Lost Electronic Devices," by David T. Haggerty, George R. Dicker, Ahmer A. Khan, Christopher B. Sharp, Timothy S. Hurley and Vineet Chadha, filed on Jan. 3, 2014, the contents of which are herein incorporated by reference.

This application is also related to U.S. Provisional Application Ser. No. 61/920,029, entitled "Deletion of Credentials from an Electronic Device," by Ahmer A. Khan, filed on Dec. 23, 2013, the contents of which are herein incorporated by reference.

BACKGROUND

Field

The described embodiments relate generally to wireless electronic devices, and more specifically to techniques for disabling the capability to conduct financial transactions using a wireless electronic device if the wireless electronic device is lost.

Related Art

Many modern electronic devices typically include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication interface).

Presently, there is increasing interest in using such electronic devices to conduct financial transactions. To facilitate this functionality, an electronic device may include a secure element to provide: security, confidentiality, and one or more application environments. The secure element may include one or more applets or applications (such as a payment applet associated with a credit card) that execute in an environment of secure element, where the applets allow the secure element to conduct a financial transaction with another electronic device, such as a point-of-sale terminal.

However, enabling a user to conduct financial transactions using electronic devices also presents a security risk. In particular, if a user loses their electronic device, there is a risk that the lost electronic device could be used to conduct fraudulent financial transactions.

Hence, it is desirable to be able to limit the risk associated with lost electronic devices.

SUMMARY

The described embodiments relate to an electronic device (such as a cellular telephone) that includes: an antenna; an interface circuit that wirelessly communicates with a management electronic device; a processor, and a memory that stores a program module executed by the processor. The program module may include instructions for: receiving, from a user of the electronic device, authentication information; determining that a capability to conduct financial transactions via the electronic device is disabled; and providing, to the management electronic device, a re-enabling command to re-enable use of the electronic device to conduct financial transactions based on the authentication information.

Note that the authentication information may include: a personal identification number; a passcode for unlocking at least some functionality of the electronic device; and/or a biometric identifier of the user.

Moreover, the capability to use the electronic device to conduct the financial transactions may have been previously disabled by the user when the user reported to the management electronic device that the electronic device was lost.

In some embodiments, the program module includes instructions for: requesting, from the user, additional authentication information associated with an account of the user, where the account is hosted by a provider of the management electronic device; receiving, from the user, the additional authentication information; and providing, to the management electronic device, the additional authentication information.

Furthermore, the electronic device may include a secure element that stores a payment applet for a financial account, and the re-enabling command may re-establish a mapping from a device primary account number (DPAN) for the financial account to a financial primary account number (FPAN) for the financial account.

Another embodiment provides a re-enabling method for re-enabling use of the electronic device to conduct the financial transactions. This re-enabling method may include at least some of the operations performed, during operation, by the electronic device.

Another embodiment provides a first computer-program product for use in conjunction with the electronic device. This first computer-program product may include instructions for at least some of the operations in the re-enabling method.

Another embodiment provides the management electronic device. This management electronic device includes: a processor; and a memory that stores a program module executed by the processor. The program module may include instructions for: receiving, from the user of a reporting electronic device, information indicating that the electronic device is lost; and, in response to receiving the information, providing a disabling command to a payment network associated with the financial account of the user to disable use of the electronic device to conduct the financial transactions.

Note that the information may have been received when the user provided login information to a lost-device application.

Moreover, the capability to use the electronic device to conduct the financial transactions may be disabled by disabling the mapping from the DPAN for the financial account to the FPAN for the financial account, and the DPAN may be associated with the payment applet stored in the secure element in the electronic device, which facilitates use of the electronic device to conduct the financial transactions.

Furthermore, the disabling command may include: the DPAN, an identifier of the electronic device, and/or an identifier of the DPAN.

In some embodiments, prior to the instructions for providing the disabling command, the program module includes instructions for accessing, in a computer-readable memory, one of: the DPAN, the identifier of the electronic device, and the identifier of the DPAN. This information may be accessed based on an identifier of the user.

Additionally, the program module may include instructions for: receiving, from the electronic device, the authentication information of the user; and providing, to the payment network, a re-enabling command to re-enable use of the electronic device to conduct the financial transactions.

Another embodiment provides a disabling method for disabling use of the electronic device to conduct the financial transactions. This disabling method may include at least some of the operations performed, during operation, by the management electronic device.

Another embodiment provides a second computer-program product for use in conjunction with the management electronic device. This second computer-program product may include instructions for at least some of the operations in the disabling method.

Another embodiment provides a system that includes the electronic device, the management electronic device and the reporting electronic device.

The preceding summary is provided for purposes of summarizing some exemplary embodiments to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

If a user loses an electronic device (such as a cellular telephone) that has the capability to conduct financial transactions, the user may report that the electronic device is lost using a lost-device software application (such as a so-called 'find-my-device' software application) to a management electronic device associated with a provider of the electronic device. In response to receiving this information, a disabling command is sent to a payment network associated with the financial account of the user to temporarily disable use of the electronic device to conduct the financial transactions. In particular, the electronic device may include a secure element that stores a payment applet for a financial account, and the disabling command may disable a mapping from a device primary account number (DPAN) for the financial account (and, more generally, a virtual identifier for the financial account) to a financial primary account number (FPAN) for the financial account (and an associated financial vehicle, such as a credit card or a debit card). Subsequently, if the user finds the electronic device, the user may re-enable the capability (and, thus, the mapping) by providing authentication information to the electronic device, such as: a personal identification number; a passcode for unlocking at least some functionality of the electronic device; and/or a biometric identifier of the user.

For example, the wireless communication between the electronic device and the management electronic device may involve conveying packets that are transmitted and received by radios in the electronic device and the management electronic device in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface, such as a near-field-communication standard or specification (from the NFC Forum of Wakefield, Mass.). In addition, the communication protocol may be compatible with a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In the discussion that follows, a cellular-telephone communication technique is used as an illustrative example.

Figure 1:
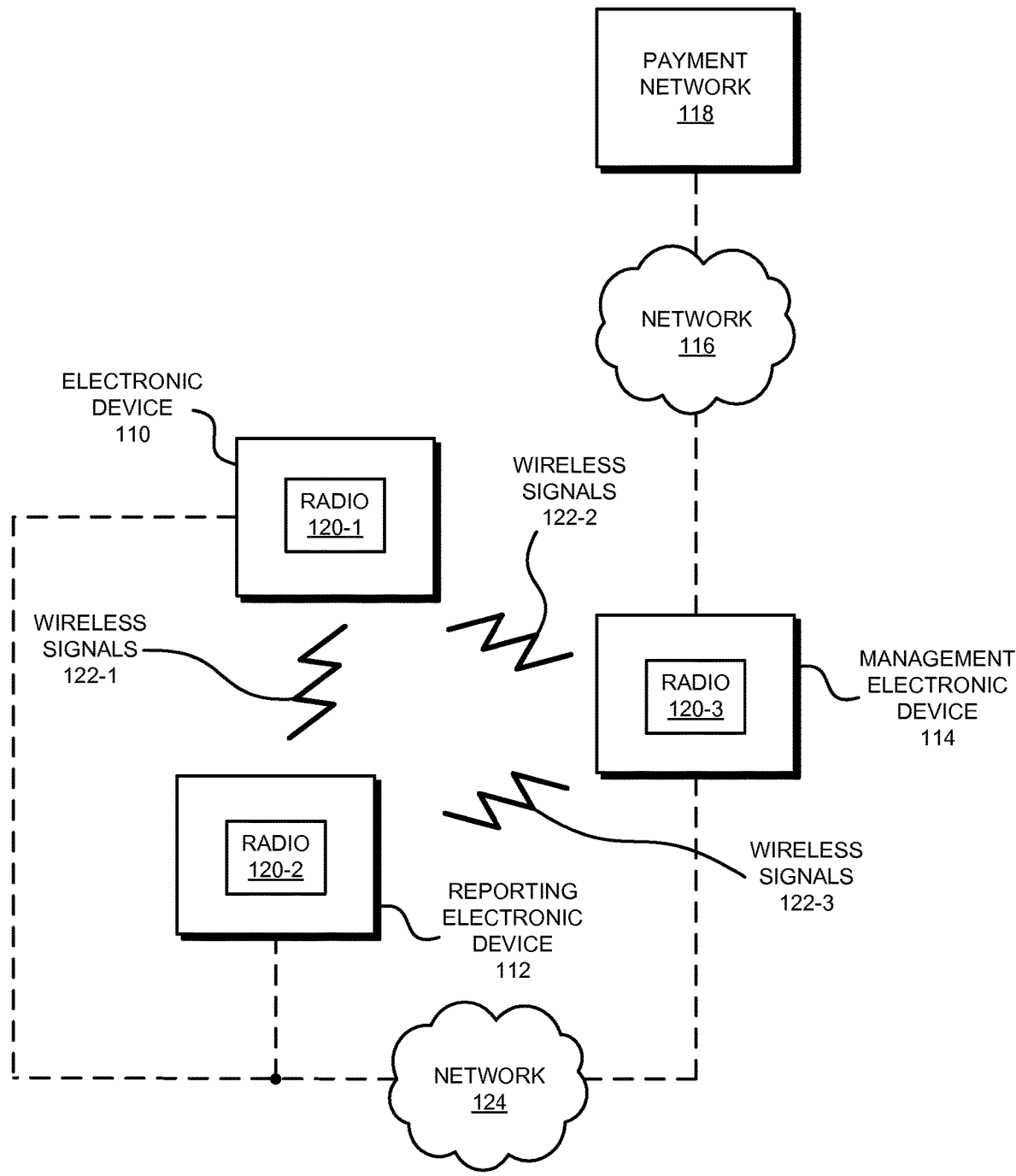
FIG. 1 is a block diagram illustrating electronic devices communicating in accordance with an embodiment of the present disclosure.

The communication between the electronic device and the management electronic device is shown in FIG. 1, which presents a block diagram illustrating electronic device 110, reporting electronic device 112 and management electronic device 114 communicating. As described further below with reference to FIGS. 2-6, these electronic devices may communicate when a user of electronic device 110 (such as a cellular telephone) loses or finds electronic device 110. In particular, if the user loses electronic device 110, the user may use reporting electronic device 112 (such as another cellular telephone, a computer, a tablet, etc.) to log in to a so-called 'find-my-device' software application, which is hosted by management electronic device 114 (such as a server computer and related networking equipment associated with a provider of electronic device 110 and, more generally, hardware under the control of and/or otherwise perform actions on behalf of the provider of electronic device 110). Note that the user may be preregistered with this find-my-device software application, and the find-my-device software application may use wireless communication between electronic device 110 and a network (such as a cellular-telephone network) to determine the approximate location of electronic device 110 (e.g., using triangulation, trilateration, time of flight, the Global Positioning System, etc.). Moreover, when the user verifies their identity by logging in to the find-my-device software application (and, more generally, by providing authentication information, such as: a personal identification number, a passcode or password, and/or a biometric identifier of the user), management electronic device 114 may temporarily 'lock' the functionality of electronic device 110 if electronic device 110 is connected to a wireless network (such as the cellular-telephone network). For example, a passcode that unlocks at least some of the functionality of electronic device 110 may be disabled. In addition, the ability to use electronic device 110 to conduct financial transactions may be disabled. This security technique, however, may not depend on electronic device 110 being connected to the wireless network.

In particular, as described further below with reference to FIG. 2, management electronic device 114 may provide, via network 116, a disabling command or instruction to a payment network 118 to at least temporarily disable (or possibly cancel) the capability of electronic device 110 to conduct financial transactions. Note that payment network 118 may process financial transactions in conjunction with a financial institution (such as a bank) that provided a financial instrument (such as a credit card, a debit card, a prepaid debit card, a gift card and, more generally, a financial vehicle) to the user. This financial instrument may be associated with a financial account of the user. (In this discussion, note that what is meant by payment network 118, etc., is hardware, such as server computers and related networking equipment, under the control of and/or otherwise able to perform actions on behalf of such entities.)

Figure 4:
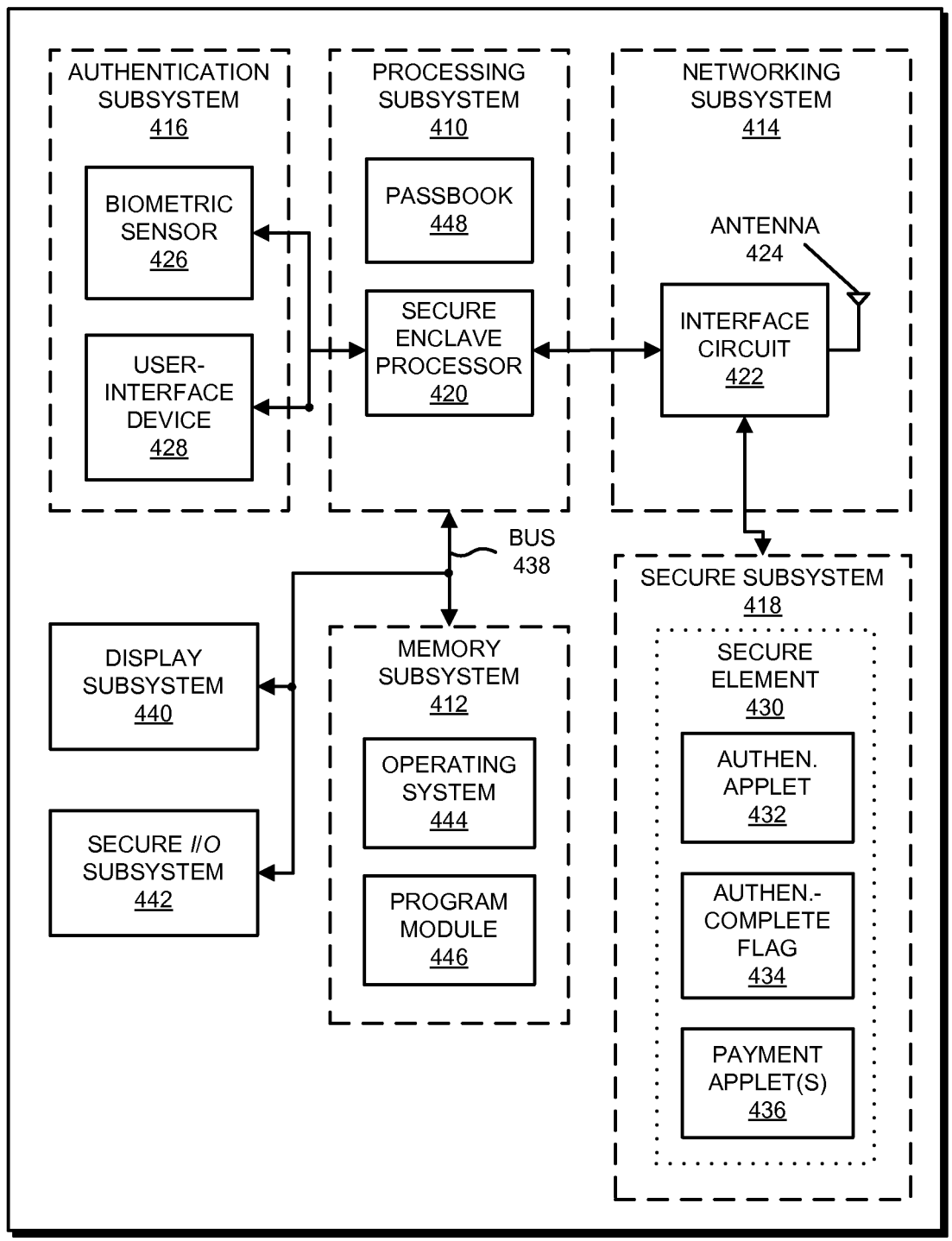
FIG. 4 is a block diagram illustrating one of the electronic devices of FIG. 1 in accordance with an embodiment of the present disclosure.

For example, as described further below with reference to FIG. 4, electronic device 110 may include a secure element with a payment applet that facilitates the use of electronic device 110 to conduct the financial transactions when activated by the user (such as by selecting the payment applet using a passbook or a digital-wallet software application executing on electronic device 110). This payment applet may have an associated device primary account number (DPAN) for the financial account and, more generally, a virtual identifier for the financial account. The disabling command or instruction provided by management electronic device 114 may disable a mapping from the DPAN to a financial primary account number (FPAN) for the financial account (such as a credit-card number), which may be performed by payment network 118 and/or the financial institution. (Thus, there may be a correspondence between the DPAN and the real FPAN.) Because electronic device 110 may not include the FPAN, by disabling the mapping electronic device 110 may not be able to successfully complete financial transactions even if a malicious third party that finds electronic device 110 tries to use it to conduct financial transactions.

As described further below with reference to FIG. 3, if the user subsequently finds electronic device 110, the user may re-enable the use of electronic device 110 to conduct financial transactions. Typically, this is accomplished by the user providing authentication information (such as: a personal identification number, a passcode or password for unlocking at least some functionality of electronic device 110, and/or a biometric identifier of the user) directly to electronic device 110 (although, in other embodiments, reporting electronic device 112 is used). For example, the biometric identifier may be acquired by a biometric sensor in electronic device 110 (such as: a fingerprint sensor, a retinal sensor, a palm sensor, a digital signature-identification sensor, etc.). Alternatively or additionally, the authentication information may include: a personal identification number (PIN) associated with the payment applet that is received using a user-interface device (such as a keypad, a touch-sensitive display, optical character recognition and/or voice recognition); and/or a passcode for unlocking at least some functionality of electronic device 110 that is received using the user-interface device.

The biometric sensor and/or the user-interface device may provide the authentication information to a secure enclave processor in a processor in electronic device 110 (which securely communicates with components in electronic device 110 using one or more encryption keys) via secure (encrypted) communication. Then, the secure enclave processor may compare the authentication information to stored authentication information. If a match is obtained, the secure enclave processor may assert an authentication-complete indicator in an operating system of electronic device 110.

Next, if electronic device 110 determines that capability to conduct financial transactions via electronic device 110 is disabled (e.g., as indicated by a passbook or digital-wallet software application executed by a processor in electronic device 110), electronic device 110 provides the authentication information (or the authentication-complete indicator) and/or a re-enabling command or instruction to management electronic device 114 to re-enable use of electronic device 110 to conduct financial transactions. In particular, the secure enclave processor may use a networking interface in electronic device 110 to wirelessly communicate an encrypted payment packet that includes this information to management electronic device 114.

After receiving the information, management electronic device 114 may provide, via network 116, the re-enabling command to payment network 118. Then, payment network 118 may re-enable the mapping. In some embodiments, prior to re-enabling the mapping, management electronic device 114 instructs electronic device 110 to request, from the user, additional authentication information associated with an account of the user (such as a cloud-based service account hosted by the provider of electronic device 110, e.g., using management electronic device 114). Once again, the additional authentication information may include: a personal identification number, a passcode or password of the account, and/or a biometric identifier of the user. After the additional authentication information is received from the user, it may be provided by electronic device 110 to management electronic device 114, which then instructs, via network 116, payment network 118 to re-enable the mapping (and, thus, the capability of electronic device 110 to conduct financial transactions).

In these ways, electronic device 110, reporting electronic device 112 and management electronic device 114 may be used to securely and flexibly disable or enable the capability to use electronic device 110 to conduct financial transactions. This seamless capability may provide a useful service to the user, because, while the user may promptly report the loss of electronic device 110, the user may not immediately remember that electronic device 110 can be used to conduct financial transactions, and thus may not realize that, in the absence of the present security technique, further action may be needed to disable this functionality. Thus, in the absence of the present security technique, there could be a lag in disabling or canceling the ability to use electronic device 110 to conduct financial transactions, which may allow fraudulent financial transactions to occur, and which may otherwise undermine user confidence in using electronic device 110 to conduct financial transactions. Consequently, the security technique may promote commercial activity.

As noted previously, the communication among electronic device 110, reporting electronic device 112 and/or management electronic device 114 may involve the exchange of packets that include financial information (such as the DPAN, financial credentials, an identifier of the user, an identifier of electronic device 110, a digital signature, etc.). These packets may be included in frames in one or more wireless channels.

As described further below with reference to FIG. 4, electronic device 110, reporting electronic device 112 and/or management electronic device 114 may include subsystems, such as: a networking subsystem, a memory subsystem, a processing subsystem and a secure subsystem. In addition, electronic device 110, reporting electronic device 112 and/or management electronic device 114 may include radios 120 in the networking subsystems. More generally, electronic device 110, reporting electronic device 112 and/or management electronic device 114 can include (or can be included within) any electronic devices with networking subsystems that enable electronic device 110, reporting electronic device 112 and/or management electronic device 114 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IPSEC), transmitting and receiving packets or frames, etc.

As can be seen in FIG. 1, wireless signals 122-1 (represented by a jagged line) are transmitted from/received by a radio 120-1 in electronic device 110. These wireless signals are received by/transmitted from radio 120-2 in reporting electronic device 112. Similarly, wireless signals 122-2 and 122-3 (represented by jagged lines) are transmitted from/received by radio 120-3 in management electronic device 114, and are received by/transmitted from radios 120-1 and 120-2 in electronic device 110 and reporting electronic device 112. (Note that the communication among electronic device 110, reporting electronic device 112 and/or management electronic device 114 may also occur via network 124, which may involve wired communication with a different communication protocol than wireless signals 122.) Moreover, the wireless communication may or may not involve a connection being established among electronic device 110, reporting electronic device 112 and/or management electronic device 114, and therefore may or may not involve communication via a wireless network (such as a cellular-telephone network).

In the described embodiments, processing a packet or frame in electronic device 110, reporting electronic device 112 and/or management electronic device 114 includes: receiving wireless signals 122 with the packet or frame; decoding/extracting the packet or frame from received wireless signals 122 to acquire the packet or frame; and processing the packet or frame to determine information contained in the packet or frame (such as the certification information).

In general, communication among electronic device 110, reporting electronic device 112 and/or management electronic device 114 may be encrypted. This encryption may use an encryption key (such as an encryption key associated with the payment applet). Furthermore, the encryption may use symmetric or asymmetric encryption techniques.

Although we describe the environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now further describe disabling and re-enabling the capability to conduct financial transactions using the electronic device. FIG. 2 presents a flow diagram illustrating a method 200 for disabling use of an electronic device (such as electronic device 110 in FIG. 1) to conduct the financial transactions, which may be performed by a processor in a management electronic device (such as management electronic device 114 in FIG. 1) that may execute a program module. During operation, the management electronic device receives, from a user of a reporting electronic device (such as reporting electronic device 112 in FIG. 1), information indicating that the electronic device is lost (operation 210). This information may have been received when the user provided login information to a lost-device application (which may execute on or be hosted by management electronic device 114 in FIG. 1).

In response to receiving the information, the management electronic device provides a disabling command to a payment network (operation 214) associated with a financial account of the user to disable use of the electronic device to conduct financial transactions. For example, the capability to use the electronic device to conduct the financial transactions may be disabled by disabling the mapping from the DPAN for the financial account to the FPAN for the financial account. Moreover, the DPAN may be associated with a payment applet stored in a secure element in the electronic device, which facilitates use of the electronic device to conduct the financial transactions.

In some embodiments, prior to providing the disabling command (operation 214), the management electronic device optionally accesses (operation 212), in a computer-readable memory, at least one identifier, such as: the DPAN, the identifier of the electronic device, and the identifier of the DPAN. This information may be accessed based on an identifier of the user and/or an identifier of the electronic device. For example, the information indicating that the electronic device is lost may include the identifier of the user and/or the identifier of the electronic device. The management electronic device may use this identifier to look up the DPAN, the identifier of the electronic device, and/or the identifier of the DPAN. Furthermore, the disabling command provided to the payment network may include: the DPAN, the identifier of the electronic device, and/or the identifier of the DPAN. This information may assist the payment network (and/or a financial institution associated with the financial account) in disabling the mapping.

As described further below with reference to FIG. 3, the management electronic device may subsequently optionally receive, from the electronic device, authentication information (operation 216) of the user. For example, if the user finds the electronic device, the user may enter their passcode into a user interface displayed on a touch-sensitive display of the electronic device. In response, the management electronic device may optionally provide, to the payment network, a re-enabling command to re-enable use of the electronic device to conduct the financial transactions (operation 218).

Note that the capability to use the electronic device to conduct financial transactions can be disabled using method 200 even if the electronic device is not connected to a wireless network.

Figure 3:
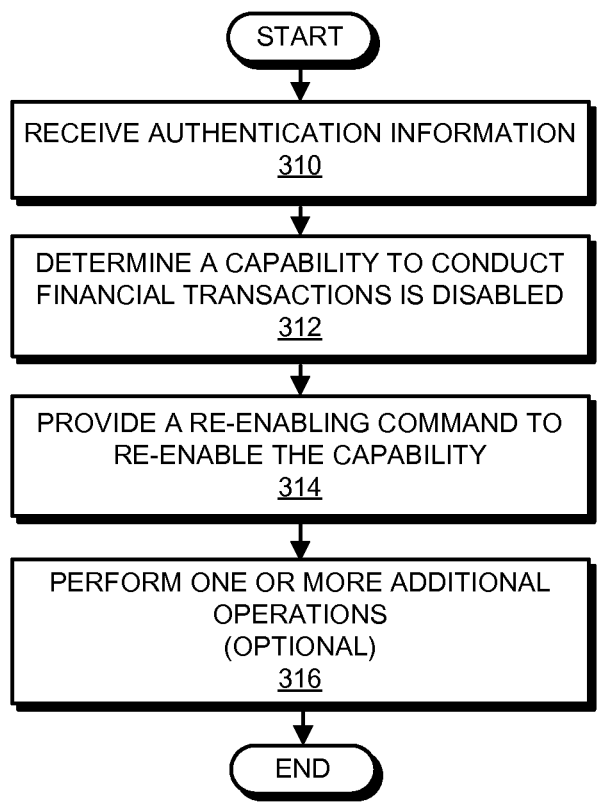
FIG. 3 is a flow diagram illustrating a method for re-enabling use of one of the electronic devices in FIG. 1 to conduct the financial transactions in accordance with an embodiment of the present disclosure.

FIG. 3 presents a flow diagram illustrating a method 300 for re-enabling use of the electronic device (such as electronic device 110 in FIG. 1) to conduct the financial transactions, which may be performed by a processor in the electronic device (which may execute a program module). During operation, the electronic device receives, from a user of the electronic device, authentication information (operation 310). Note that the authentication information may include: a personal identification number; a passcode for unlocking at least some functionality of the electronic device; and/or a biometric identifier of the user.

Then, the electronic device determines that a capability to conduct financial transactions, via the electronic device, is disabled (operation 312). For example, the capability to use the electronic device to conduct the financial transactions may have been previously disabled by the user when the user reported to the management electronic device that the electronic device was lost.

Next, the electronic device provides, to a management electronic device (such as management electronic device 114 in FIG. 1), the re-enabling command (or information, such as an identifier, which can be used by the management electronic device to generate the re-enabling command) to re-enable use of the electronic device to conduct financial transactions based on the authentication information (operation 314). In addition to or instead of the authentication information, the re-enabling command may include: an identifier of the user and/or an identifier of the electronic device.

Furthermore, the electronic device may include a secure element that stores a payment applet for a financial account, and the re-enabling command may re-establish a mapping from the DPAN for the financial account to the FPAN for the financial account.

In some embodiments, the electronic device optionally performs one or more additional operations (operation 316). In particular, the electronic device may optionally request, from the user, additional authentication information associated with an account of the user, where the account is hosted by a provider of the management electronic device. Then, the electronic device optionally receives, from the user, the additional authentication information, and optionally provides, to the management electronic device, the additional authentication information. This secondary authentication may be used to authenticate the user.

We now describe embodiments of the electronic device. FIG. 4 presents a block diagram illustrating electronic device 110. This electronic device includes processing subsystem 410, memory subsystem 412, networking subsystem 414, authentication subsystem 416 and secure subsystem 418. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

In addition, processing subsystem 410 may include a secure enclave processor 420 (which is a system-on-chip within one or more processors in processing subsystem 410) that performs security services for other components in the processing subsystem 410 and that securely communicates with other subsystems in electronic device 110. Secure enclave processor 420 may include one or more processors, a secure boot ROM, one or more security peripherals, and/or other components. The security peripherals may be hardware-configured to assist in the secure services performed by secure enclave processor 420. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 420 are stored in a trust zone in memory subsystem 412 that is assigned to secure enclave processor 420, and secure enclave processor 420 fetches the instructions from the trust zone for execution. Secure enclave processor 420 may be isolated from the rest of processing subsystem 410 except for a carefully controlled interface, thus forming a secure enclave for secure enclave processor 420 and its components. Because the interface to secure enclave processor 420 is carefully controlled, direct access to components within secure enclave processor 420 (such as a processor or a secure boot ROM) may be prevented. In some embodiments, secure enclave processor 420 encrypts and/or decrypts authentication information communicated with authentication subsystem 416, and encrypts and/or decrypts information (such as tokens) communicated with secure subsystem 418. Furthermore, secure enclave processor 420 may compare authentication information with stored authentication and, if a match is obtained, may provide an encrypted token with an authentication-complete indicator to a secure element 430 and/or may assert the authentication-complete indicator as a flag in operating system 444.

Memory subsystem 412 includes one or more devices for storing data and/or instructions for processing subsystem 410, networking subsystem 414, authentication subsystem 416 and/or secure subsystem 418. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program module 446, e.g., a digital wallet, a passbook and/or a mobile payments application), which may be executed by processing subsystem 410. Note that the one or more computer programs may constitute a computer-program mechanism or a program module. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 110. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 110 as fast-access storage for often-used data, while the mass-storage device is used to store less frequently used data.

Networking subsystem 414 includes one or more devices configured to couple to and communicate on a wired and/or wireless network (i.e., to perform network operations), including an interface circuit 422 (such as a near-field-communication circuit) and an antenna 424. For example, networking subsystem 414 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi® networking system), an Ethernet networking system, and/or another communication system (such as a near-field-communication system).

Networking subsystem 414 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 110 may use the mechanisms in networking subsystem 414 for performing simple wireless communication among electronic device 110, reporting electronic device 112 (FIG. 1) and management electronic device 114 (FIG. 1), e.g., transmitting advertising frames and/or near-field communication.

Authentication subsystem 416 may include one or more processors, controllers and devices for receiving the authentication information from a user of electronic device 110, and for securely communicating this authentication information to processing subsystem 410 (such as by encrypting the authentication information). For example, the authentication information may include: a biometric identifier acquired by a biometric sensor 426 (such as: a fingerprint sensor, a retinal sensor, a palm sensor, a digital signature-identification sensor, etc.); a personal identification number (PIN) associated with one of payment applets 436 that is received using a user-interface device 428 (such as a keypad, a touch-sensitive display, optical character recognition and/or voice recognition); and a passcode for unlocking at least some functionality of electronic device 110 that is received using user-interface device 428.

Furthermore, secure subsystem 418 may include a secure element 430, which includes one or more processors and memory. Note that secure element 430 may be a tamper-resistant component that is used in electronic device 110 to provide the security, confidentiality, and multiple application environments required to support various business models. Secure element 430 may exist in one or more of a variety of form factors, such as: a universal integrated circuit card (UICC), an embedded secure element (on a circuit board in electronic device 110), a smart secure digital (SD) card, a smart microSD card, etc.

Moreover, secure element 430 may include one or more applets or applications that execute in an environment of secure element 430 (such as in the operating system of secure element 430, and/or in a Java runtime environment executing on the secure element 430). For example, the one or more applets may include an authentication applet 432 that: performs contactless registry services, encrypts/decrypts packets or tokens communicated with secure enclave processor 420, sets one or more software flags (such as an authentication-complete flag 434) in an operating system of secure element 430, and/or conveys information to one or more payment applets 436. The one or more applets may include one or more payment applets 436 that conduct financial transactions with reporting electronic device 112 (FIG. 1) when they are activated by program module 446, and based on the one or more software flags and/or when electronic device 110 is proximate to reporting electronic device 112 (FIG. 1). In particular, payment applets 436 may each be associated with a financial vehicle (such as a credit card, a debit card, a prepaid debit card, a gift card and, more generally, a financial vehicle provided by a financial institution, e.g., a bank, that is associated with a financial account of a user, such as a user of electronic device 110). In addition, secure element 430 may include information associated with the one or more payment applets 436 (such as a financial credential, e.g., a DPAN, a PIN, a debit-card number, that is associated with a given payment applet, and one or more encryption keys that are associated with the given payment applet) that is used when conducting the financial transactions.

Authentication applet 432 may execute in a master or issuer security domain in secure element 430 (such as controlling authority security domain), while payment applets 436 may execute in supplemental security domains. Communication among these security domains may be encrypted using different encryption/decryption keys that are security-domain specific. In electronic device 110 and/or during communication among electronic device 110, reporting electronic device 112 (FIG. 1) and/or management electronic device 114 (FIG. 1), encryption/decryption may involve symmetric and/or asymmetric encryption. In addition, the information communicated may also include a digital signature that is specific to electronic device 110 and/or components in electronic device 110, such as secure element 430 or one of payment applets 436.

During operation of electronic device 110 the user may use passbook 448 to select or activate one or more of payment applets 436. If the payment applet supports authentication-complete flag 434 (as indicated by the enabling or setting of authentication support in the payment applet), in order for the payment applet to conduct a financial transaction with another electronic device, the payment applet may need to be activated and authentication-complete flag 434 may need to be set or enabled in secure element 430 (indicating that the user has been authenticated). In contrast, for one of payment applets 436 that does not support authentication-complete flag 434, a financial transaction may be conducted when this payment applet is active (i.e., operation of the payment applet is not gated by the setting or enabling of authentication-complete flag 434 in secure element 430). While the present discussion illustrates the use of a global authentication-complete flag, note that in some embodiments there are separate authentication-complete flags associated with at least some of payment applets 436 (i.e., there may be a specific authentication-complete flag for a given payment applet, etc.).

When electronic device 110 is proximate to the other electronic device (such as a point-of-sale terminal) or when secure enclave processor 420 provides a payment command to secure element 430, one of the specified, activated and/or authenticated payment applets 436 may provide a payment packet (which may be encrypted or unencrypted) to interface circuit 422 or to secure enclave processor 420 (which then provides the payment packet to interface circuit 422). Then, interface circuit 422 may communicate the payment packet to the other electronic device (such as a point-of-sale terminal) using antenna 424. Note that the payment packet may include financial information (such as a financial credential or a DPAN associated with the one of the payment applets 436).

This financial information may be communicated by the other electronic device to payment network 118 (FIG. 1) to complete a financial transaction. In particular, payment network 118 (FIG. 1) may map the DPAN to an FPAN for a financial account associated with the payment applet. In conjunction with additional information provided by the other electronic device (such as a merchant identifier, an amount of the financial transaction, etc.), payment network 118 (FIG. 1) and/or the financial institution associated with the payment applet may process and complete the financial transaction. Once the financial transaction is complete, a notification from management electronic device 114 (FIG. 1) may be received by interface circuit 422. Passbook 448 may provide the notification to display subsystem 440 for display, so the user of electronic device 110 can be alerted that the financial transaction was successfully completed.

As noted previously, if the user previously reported that electronic device 110 was lost, the capability to conduct financial transactions using electronic device 110 may have been disabled. If the user finds electronic device 110, and provides authentication information (such as a passcode, a PIN, a biometric identifier, etc.) using authentication subsystem 416, a program module (such as program module 446) may be executed by processing subsystem 410 to perform the operations in method 300 (FIG. 3) to re-enable the capability. In particular, when executing program module 446, processing subsystem 410 may receive authentication information. If secure enclave processor 420 determines that the authentication information matches stored authentication information, processing subsystem 410 may determine that the capability to conduct financial transactions has been disabled. For example, a processor in processing subsystem 410 may determine that a disable flag has been set in passbook 448 and/or operating system 444. Then, processing subsystem 410 may provide information (such as the authentication information, an identifier of the user, an identifier of electronic device 110, etc.) to management electronic device 114 (FIG. 1) using interface circuit 422 and antenna 424. Once payment network 118 (FIG. 1) and/or the financial institution have re-enabled the capability to conduct financial transactions, a notification may be received from management electronic device 114 (FIG. 1) using antenna 424 and interface circuit 422. In response, an enable flag may be set in passbook 448 and/or operating system 444.

In some embodiments, program module 446 may first request the additional authentication information. This additional authentication information may be received by authentication subsystem 416 and then provided to management electronic device 114 (FIG. 1) using interface circuit 422 and antenna 424.

Within electronic device 110, processing subsystem 410, memory subsystem 412, networking subsystem 414, authentication subsystem 416 and secure subsystem 418 may be coupled using one or more interconnects, such as bus 438. These interconnects may include an electrical, optical, and/or electro-optical connection that the subsystems can use to communicate commands and data among one another. Note that different embodiments can include a different number or configuration of electrical, optical, and/or electro-optical connections among the subsystems. In some embodiments, electronic device 110 can detect tampering with secure components (such as secure enclave processor 420, secure element 430 and/or bus 438) and may destroy encryption/decryption keys or authentication information (such as a stored biometric identifier) if tampering is detected.

In some embodiments, electronic device 110 includes display subsystem 440 for displaying information on a display (such as a notification of a successfully completed financial transaction or whether the capability to conduct financial transactions is enabled or disabled), which may include a display driver and the display, such as a liquid-crystal display, a multi-touch touchscreen, etc. In addition, in some embodiments electronic device 110 includes a secure input/output (I/O) subsystem 442 (such as a keypad) for receiving the PIN of the user that is associated with one of payment applets 436. As noted previously, display subsystem 440 and/or secure I/O subsystem 442 may be included in authentication subsystem 416.

Electronic device 110 can be (or can be included in) any electronic device with at least one network interface. For example, electronic device 110 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 110, in alternative embodiments, different components and/or subsystems may be present in electronic device 110. For example, electronic device 110 may include one or more additional processing subsystems, memory subsystems, networking subsystems, authentication subsystems, secure subsystems, display subsystems and/or secure I/O subsystems. Additionally, one or more of the subsystems may not be present in electronic device 110. Moreover, in some embodiments, electronic device 110 may include one or more additional subsystems that are not shown in FIG. 4. For example, electronic device 110 can include, but is not limited to, a data collection subsystem, an audio and/or video subsystem, an alarm subsystem, and/or a media processing subsystem. Also, although separate subsystems are shown in FIG. 4, in some embodiments, some or all of a given subsystem or component can be integrated into one or more of the other subsystems or components in electronic device 110. For example, in some embodiments program module 446 is included in operating system 444. Alternatively or additionally, at least some of the functionality of program module 446 may be included in passbook 448.

Moreover, the circuits and components in electronic device 110 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414 (such as a radio) and, more generally, some or all of the functionality of electronic device 110. Moreover, the integrated circuit may include hardware and/or software mechanisms that are used for transmitting wireless signals from electronic device 110 to, and receiving signals at electronic device 110 from, reporting electronic device 112 (FIG. 1) and/or management electronic device 114 (FIG. 1). Aside from the mechanisms herein described, radios are generally known in the art and hence are not described in detail. In general, networking subsystem 414 and/or the integrated circuit can include any number of radios. Note that the radios in multiple-radio embodiments function in a similar way to the radios described in single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with a cellular-telephone network was used as an illustrative example, the described embodiments of the security technique may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

While the preceding discussion focused on the hardware, software and functionality in electronic device 110, reporting electronic device 112 (FIG. 1) and/or management electronic device 114 (FIG. 1) may have the same or similar hardware (processors, memory, networking interfaces, etc.) and/or software to support the operations performed by these entities, as described previously with reference to FIG. 2 and, further, below with reference to FIG. 5. In particular, these entities may include one or more computer systems with a processing subsystem that executes one or more program modules stored in a memory subsystem to perform the operations, and one or more networking interfaces for communicating with other electronic devices, such as electronic device 110.

Figure 2:
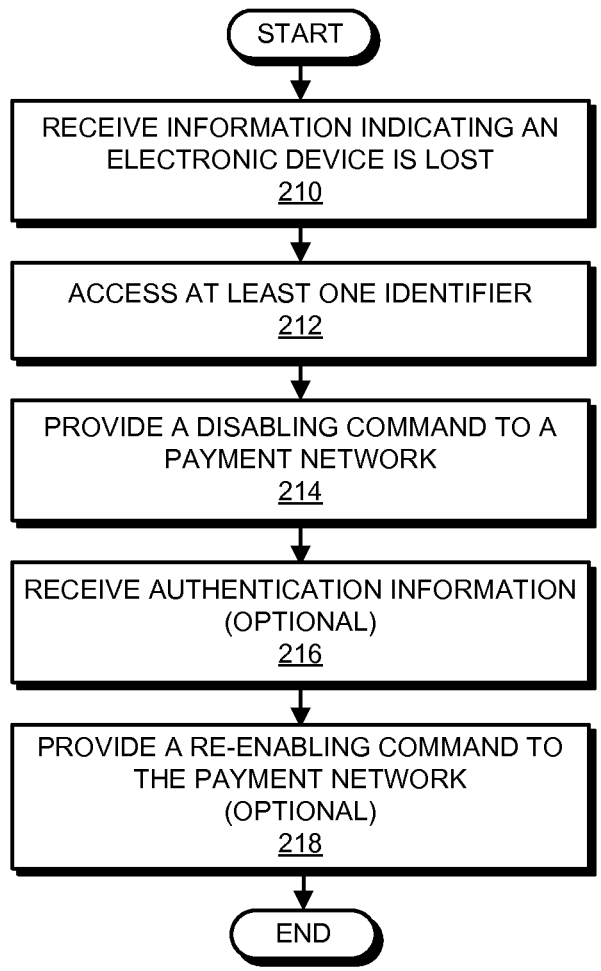
FIG. 2 is a flow diagram illustrating a method for disabling use of one of the electronic devices in FIG. 1 to conduct the financial transactions in accordance with an embodiment of the present disclosure.
Figure 5:
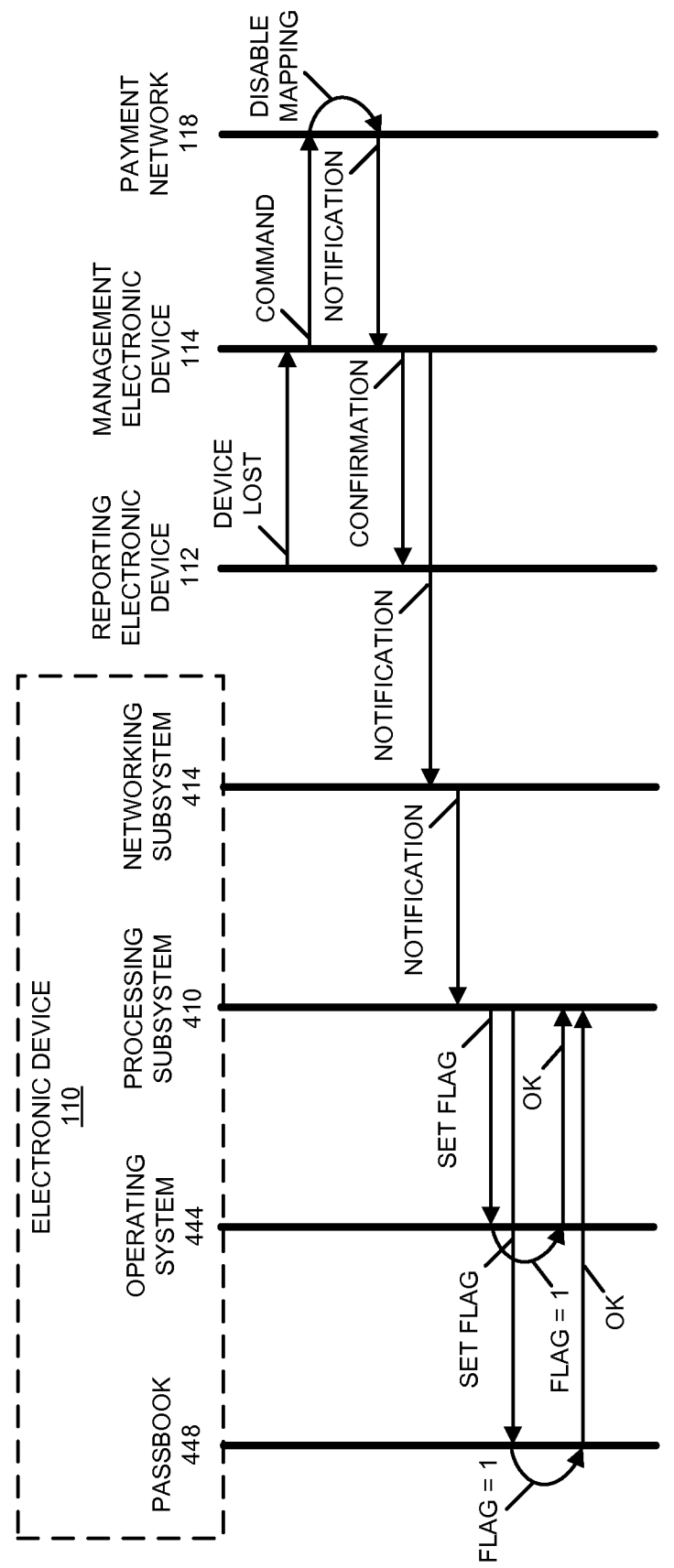
FIG. 5 is a drawing illustrating communication between the electronic devices of FIG. 1 in accordance with an embodiment of the present disclosure.

We now describe FIG. 5, which presents a drawing illustrating communication within electronic device 110 (FIGS. 1 and 4), and among electronic device 110, reporting electronic device 112 and/or management electronic device 114 (FIG. 1), and which provides further information regarding the aforementioned security technique of FIG. 2. In particular, a user of reporting electronic device 112 may provide the information indicating that electronic device 110 is lost to management electronic device 114. In response, management electronic device 114 may provide the disabling command or the instruction to payment network 118 to disable the capability of using electronic device 110 to conduct financial transactions. In turn, payment network 118 may disable the mapping from one or more DPANs for one or more payment applets stored in electronic device 110 to one or more FPANs.

Once the mapping is disabled (at least temporarily), payment network 118 may notify management electronic device 114, which provides a confirmation to reporting electronic device 112. In addition, management electronic device 114 may provide a notification to electronic device 110. If electronic device 110 is connected to a wireless network, this notification may be received using networking subsystem 414, which provides the information to processing subsystem 410. Processing subsystem 410 may set a flag in passbook 448 and/or operating system 444 to indicate that the capability is disabled.

Figure 6:
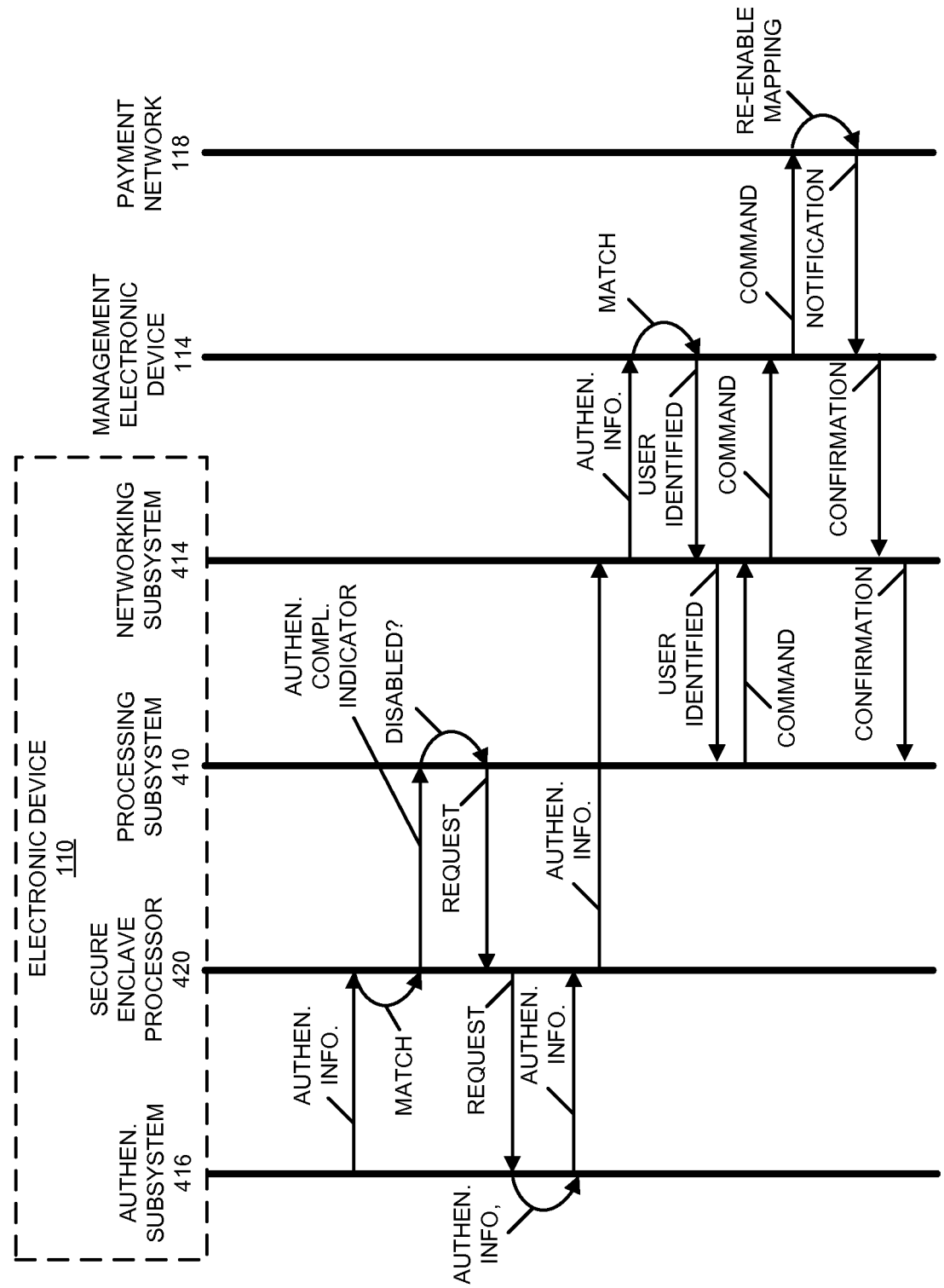
FIG. 6 is a drawing illustrating communication between the electronic devices of FIG. 1 in accordance with an embodiment of the present disclosure.

FIG. 6 presents a drawing illustrating communication within electronic device 110 (FIGS. 1 and 4), and between electronic device 110 and management electronic device 114 (FIG. 1), and which provides further information regarding the aforementioned security technique of FIG. 3. In particular, if the user finds electronic device 110, the user may provide authentication information to secure enclave processor 420 via authentication subsystem 416. Then, secure enclave processor 420 compares the authentication information to stored authentication information. If there is a match, secure enclave processor 420 provides an authentication-complete indicator to a secure element 430 and/or may assert the authentication-complete indicator as a flag in operating system 444.

Next, processing subsystem 410 may determine that the capability to conduct financial transactions is disabled. In response, processing subsystem 410 may, via networking subsystem 414, provide the re-enabling command or the instruction to management electronic device 114.

In response, management electronic device 114 may provide the re-enabling command or the instruction to payment network 118 to re-enable the capability of using electronic device 110 to conduct financial transactions. In turn, payment network 118 may re-enable the mapping from one of more DPANs for one or more payment applets stored in electronic device 110 to one or more FPANs.

Once the mapping is re-enabled, payment network 118 may notify management electronic device 114, which provides a notification to electronic device 110. This notification may be received using networking subsystem 414, which provides the information to processing subsystem 410. Processing subsystem 410 may set a flag in passbook 448 (FIG. 4) and/or operating system 444 (FIG. 4) to indicate that the capability is enabled.

In some embodiments, prior to re-enabling the capability, processing subsystem 410, via secure enclave processor 420, requests the additional authentication information. This authentication information may be provided by the user to authentication subsystem 416. Then, authentication subsystem 416 provides the additional authentication information to secure enclave processor 420. Moreover, secure enclave processor 420 may communicate the additional authentication information to management electronic device 114 via networking subsystem 414. Networking subsystem 414 may use the additional authentication information to authenticate the user before additional operations in the security technique are performed.

Note that the operations illustrated in FIGS. 5 and 6 may include challenge and response operations, which are not shown for clarity.

In these ways, the security technique may facilitate disabling or re-enabling the capability to use the electronic device to conduct financial transactions.

In some embodiments of methods 200 (FIG. 2) and 300 (FIG. 3), there may be additional or fewer operations. Furthermore, the order of the operations may be changed, and/or two or more operations may be combined into a single operation. For example, in FIG. 3, the operations in method 300 may be performed by another electronic device (such as reporting electronic device 112 in FIG. 1) instead of the electronic device.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device comprising:
an interface circuit configured to communicate with a management electronic device;
a memory;
a secure element configured to store information associated with a financial account;
a processor coupled to the secure element and configured to:
receive authentication information;
determine, after receiving the authentication information and based on a flag, that a capability to conduct financial transactions via the electronic device is disabled;
in response to determining that the capability to conduct the financial transactions is disabled, receive additional authentication information;
transmit the additional authentication information to the management electronic device;
receive a message indicating the management electronic device has authenticated the additional authentication information;
in response to receiving the message, provide, to the management electronic device, a re-enabling command to cause a payment network, in communication with the management electronic device, to re-enable the capability of the electronic device to conduct the financial transactions, wherein the re-enabling command is configured to cause the payment network to re-establish a mapping from a device primary account number (DPAN) for the financial account to a financial primary account number (FPAN) for the financial account;
receive, from the management electronic device, a notification that the payment network has re-established the mapping to re-enable the capability of the electronic device to conduct the financial transactions; and
update the flag responsive to receiving the notification.

2. The electronic device of claim 1, wherein the authentication information comprises a personal identification number, a passcode for unlocking at least some functionality of the electronic device, a biometric identifier, or a combination thereof.

3. The electronic device of claim 1, wherein the capability to conduct the financial transactions is disabled in response to receiving a disabling command from the management electronic device that the electronic device is lost.

4. The electronic device of claim 1, wherein the processor is further configured to:
request the additional authentication information, wherein the additional authentication information is associated with an account of a provider of the management electronic device.

5. The electronic device of claim 1, wherein the DPAN is associated with a payment applet stored in the secure element.

6. The electronic device of claim 1, wherein the processor is further configured to:
transmit the additional authentication information to a device locator application; and
based on transmitting the additional authentication information, temporarily disable a capability for unlocking the electronic device.

7. The electronic device of claim 1, wherein the re-enabling command comprises at least one of a user identifier and an electronic device identifier.

8. The electronic device of claim 1, wherein the financial account is associated with a financial instrument provided by the payment network.

9. A method for re-enabling use of an electronic device to conduct financial transactions, wherein the method comprises:
receiving authentication information;
determining, based on a flag, that a capability to conduct the financial transactions via the electronic device is disabled;
in response to determining that the capability to conduct the financial transactions is disabled, receiving additional authentication information;
transmitting the additional authentication information to a management electronic device;
receiving a message indicating the management electronic device has authenticated the additional authentication information;
in response to receiving the message, providing, to the management electronic device, a re-enabling command to cause a payment network, in communication with the management electronic device, to re-enable the capability of the electronic device to conduct the financial transactions, wherein the re-enabling command is configured to cause the payment network to re-establish a mapping from a device primary account number (DPAN) for a financial account to a financial primary account number (FPAN) for the financial account, wherein the DPAN is associated with a payment applet stored in a secure element in the electronic device;
receiving, from the management electronic device, a notification that the payment network has re-established the mapping to re-enable the capability of the electronic device to conduct the financial transactions; and
updating the flag responsive to receiving the notification.

10. The method of claim 9, wherein the capability to conduct the financial transactions is disabled in response to receiving a disabling command from the management electronic device that the electronic device is lost.

11. The method of claim 9, wherein the authentication information comprises a personal identification number, a passcode for unlocking at least some functionality of the electronic device, a biometric identifier, or a combination thereof.

12. The method of claim 9, further comprising:
requesting the additional authentication information, wherein the additional authentication information is associated with an account of a provider of the management electronic device.

13. A non-transitory computer-readable medium storing instructions that, when executed by an electronic device, cause the electronic device to perform a method, the method comprising:

receiving authentication information;

determining, based on a flag, that a capability to conduct financial transactions via the electronic device is disabled;

in response to determining that the capability to conduct the financial transactions is disabled, receiving additional authentication information;

transmitting the additional authentication information to a management electronic device;

receiving a message indicating the management electronic device has authenticated the additional authentication information;

in response to receiving the message, providing, to the management electronic device, a re-enabling command configured to cause a payment network, in communication with the management electronic device, to re-enable the capability of the electronic device to conduct the financial transactions, wherein the re-enabling command causes the payment network to re-establish a mapping from a device primary account number (DPAN) for the financial account to a financial primary account number (FPAN) for the financial account;

receiving, from the management electronic device, a notification that the payment network has re-established the mapping to re-enable the capability of the electronic device to conduct the financial transactions; and updating the flag responsive to receiving the notification.

14. The non-transitory computer-readable medium of claim 13, wherein the authentication information comprises a personal identification number, a passcode for unlocking at least some functionality of the electronic device, a biometric identifier, or a combination thereof.

15. The non-transitory computer-readable medium of claim 13, the method further comprising:
   requesting the additional authentication information, wherein the additional authentication information is associated with an account of a provider of the management electronic device.

16. The non-transitory storage medium of claim 13, wherein the capability to conduct the financial transactions is disabled in response to receiving a disabling command from the management electronic device that the electronic device is lost.

17. The non-transitory storage medium of claim 13, wherein the DPAN is associated with a payment applet stored in a secure element in the electronic device.

18. An electronic device comprising:
   an interface circuit configured to communicate with a management electronic device;
   a secure element configured to store a payment applet associated with a device primary account number (DPAN); and
   a processor coupled to the secure element and configured to:
      receive authentication information;
      determine, based on a flag, that a capability to conduct financial transactions with the electronic device is disabled;
      in response to determining that the capability to conduct the financial transactions is disabled, receive additional authentication information;
      transmit the additional authentication information to the management electronic device;
      receive a message indicating the management electronic device has authenticated the additional authentication information;
      in response to receiving the message, provide, to the management electronic device, a re-enabling command configured to cause a payment network, in communication with the management electronic device, to re-enable the capability of the electronic device to conduct the financial transactions, wherein the re-enabling command causes the payment network to re-establish a mapping from a device primary account number (DPAN) for a financial account to a financial primary account number (FPAN) for the financial account;
      receive, from the management electronic device, a notification that the payment network has re-established the mapping to re-enable the capability of the electronic device to conduct the financial transactions; and
      update the flag responsive to receiving the notification.

19. The electronic device of claim 18, wherein the processor is further configured to:
   request the additional authentication information, wherein the additional authentication information is associated with an account of a provider of the management electronic device.

20. A non-transitory computer-readable medium storing instructions that, when executed by an electronic device, cause the electronic device to perform a method, the method comprising:
   receiving authentication information;
   determining, based on a flag, that a capability to conduct financial transactions with the electronic device is disabled;
   in response to determining that the capability to conduct the financial transactions is disabled, receiving additional authentication information;
   transmitting the additional authentication information to a management electronic device;
   receiving a message indicating the management electronic device has authenticated the additional authentication information; and
   in response to receiving the message, providing, to the management electronic device, a re-enabling command configured to cause a payment network, in communication with the management electronic device, to re-enable the capability of the electronic device to conduct the financial transactions based at least in part on the authentication information, and to re-establish a mapping from a device primary account number (DPAN) for a financial account to a financial primary account number (FPAN) for the financial account,
   wherein the DPAN is associated with a payment applet stored in a secure element of the electronic device.

21. The non-transitory computer-readable medium of claim 20, the method further comprising:
   requesting the additional authentication information, wherein the additional authentication information is associated with an account of a provider of the management electronic device.

* * * * *